Sept. 23, 1941.   C. A. DE GIERS   2,256,473
ELECTRIC PRESSURE INDICATOR
Filed Oct. 24, 1939
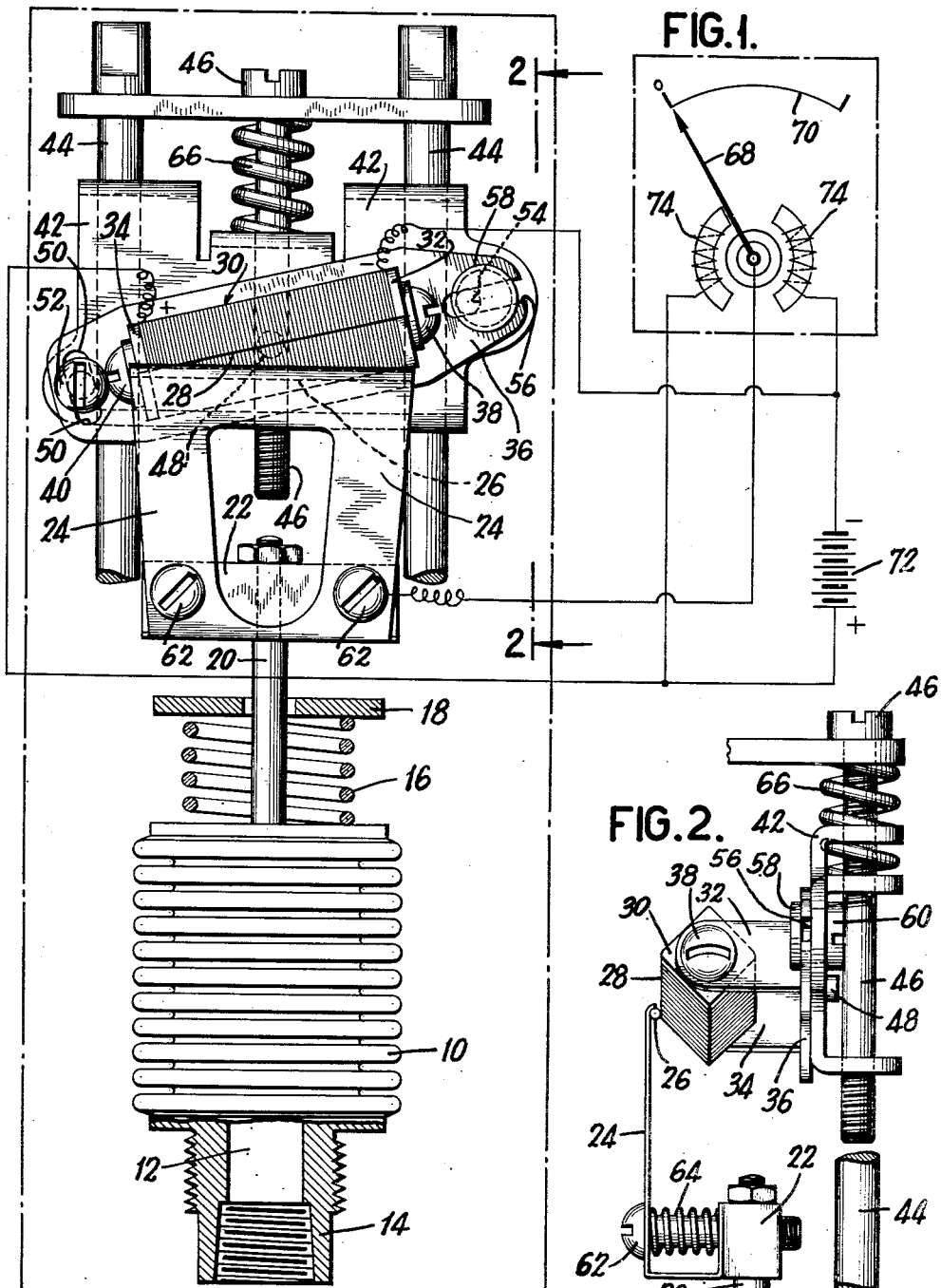
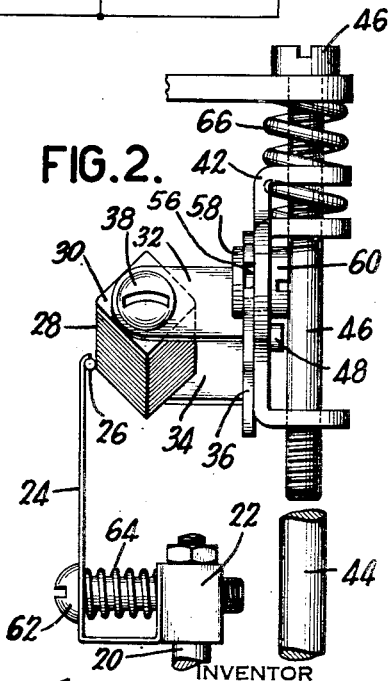
INVENTOR
Clarence A. De Giers
BY
Cooper, Kerr & Dunham
ATTORNEYS Patented Sept. 23, 1941

2,256,473

UNITED STATES PATENT OFFICE 2,256,473

ELECTRIC PRESSURE INDICATOR

Clarence A. de Giers, Forest Hills, N. Y., assignor to The Liquidometer Corporation, Long Island City, N. Y., a corporation of Delaware Application October 24, 1939, Serial No. 300,949

4 Claims. (Cl. 201—48)

This invention pertains to an electric instrument for indicating pressure at a remote point. For instance, in large airplanes, pressure of engine lubricating oil, manifold pressure, temperature changes, (converted into pressure) and the like may be indicated in the pilot's control cabin.

A transmitting element at the source of pressure controls the remote indicating element.

An object of the invention is to disclose a transmitter which is simple, sturdy, not likely to get out of order, and which avoids the use of rotary motion with its necessary friction bearings, pivots, links, gears and the like.

The transmitter comprises a resistance strip in the form of a coil of wire wound around an insulating core preferably triangular, quadrangular or polygonal in cross-section to provide a plurality of contact edges any one of which may be used, thus distributing the wear among several comparatively blunt edges, and improving the durability of the device.

The resistance strip is manually rotatable around its axis to place any selected edge in contact with a linear shoe attached to, and movable by, a pressure responsive element.

The resistance strip is so mounted that zero adjustment of the indicator is accomplished by simply moving the strip bodily with reference to the contact shoe, and capacity adjustment is provided by simply changing the angle of the strip with reference to the shoe.

The avoidance of arcuate movements or contacts greatly simplifies the making of transmitter adjustments because the graduations on the indicator will still serve to indicate accurately after an adjustment is made. This it not true if an arcuate movement is relied upon for controlling a sliding contact.

Further and other objects and advantages will be apparent from the specification and claims, and from the accompanying drawing which illustrates what is now considered a preferred embodiment of the invention.

Figure 1 is a front view of the transmitter with the pressure responsive element and remote indicator shown largely diagrammatically.

Fig. 2 is a side view of the transmitter on line 2—2 of Fig. 1.

The pressure responsive element is shown as a Sylphon type of bellows 10, commonly known in the trade as a Sylphon with its upper vertically movable end sealed, and its lower fixed end open through passage 12 in fitting 14 to a variable pressure. A spring resistance 16 is placed between the top of the Sylphon and a fixed part of the frame 18.

A vertical rod 20 connects the upper end of the Sylphon to an insulating block 22 which supports a sheet metal bracket 24 having at its upper end a contact shoe in the form of a straight horizontal wire 26.

Shoe 26 is in contact with an edge 28 of resistance coil or strip 30, which, as shown, is wound in quadrilateral form in order to provide four edges 28, any one of which may be placed in contact with shoe 26. Although shown with four edges, the strip may have 3 or 5 or any desired number.

Element 30 is supported by ears 32, 34, projecting from plate 36, and is held in adjusted position by screws 38, 40, passing through ears 32, 34 and threaded axially into the insulating block around which the resistance wire is wound. By simply loosening those screws the strip may be rotated about its axis to any desired position.

Plate 36, is, in turn, adjustably mounted on a cross-head 42 slidable vertically on guides 44 under control of screw 46. Plate 36 is pivoted at 48 on cross-head 42. The left end of plate 36 has a slot 50 through which screw 52 threaded into the cross-head holds the plate in any position to which it may be adjusted by crank pin 54 in slot 56 at the right-hand end of the plate. Crank pin 54 is part of a rotatable unit comprising a disk 58 in front of plate 36, a slotted head 60 behind cross-head 42, and crank pin 54, all rotatable about center 52 by the operator to cause crank pin 54 to change the angle of edge 28 (in the plane of the paper) with reference to shoe 26, thereby adjusting the number of coils of resistance wire passed over on edge 28 by shoe 26 for a given vertical travel of the shoe.

Bracket 24 holds shoe 26 in resilient contact with the edge 28, the pressure being manually adjustable by screw 62. Springs 64 on screw 62, 66 on screw 46, and 16 above the Sylphon serve to prevent lost motion of bracket 24, of cross-head 42, and of shoe 26, respectively.

A remote indicator having a pointer 68 movable with reference to a chart 70 is wired in conventional manner so that more or less current will flow from source 72 through the indicator coil 74, depending upon the point of contact of shoe 26 on edge 28, and that point of contact depends upon the pressure in Sylphon 10.

From the above it will be appreciated that zero adjustment of the indicator is secured by simply moving cross-head 42 and coil 30 vertically until, with no pressure in the Sylphon, the point of contact of shoe 26 and edge 28 is found which gives zero reading on the indicator. Capacity adjustment is made by tilting the strip or coil 30 around its trunnion 46 until, with capacity pressure in the Sylphon, pointer 68 will point to the proper figure on chart 70. If the making of this capacity adjustment disturbs the zero adjustment, the latter can be instantly readjusted.

It is to be understood that the invention is not limited to the specific embodiment herein illustrated and described, but may be used in other ways without departure from its spirit as defined by the following claims.

I claim:

1. In a device of the class described, a resistance strip and a contact shoe, said strip and said shoe having straight line edges in the same plane in angular relationship with each other and having a point of contact between said edges, means for moving the straight line edge of the contact shoe across the straight line edge of said resistance strip to bring another point of contact between said edges, said resistance strip comprising wire wrapped around a polygonal insulating block whereby a plurality of contact edges are formed, and manually adjustable means for placing any selected one of said last mentioned edges in operative position in said plane.

2. In a device of the class described, a resistance strip and a contact shoe, said strip and said shoe having straight linear edges in the same plane in angular relationship with each other and having a point of contact between said edges, means for moving one of said edges parallel with itself in said plane to another point of contact between said edges, and manually operable means for varying the angular relationship between said edges in said plane, whereby the effective portion of the resistance strip may be adjusted for a given movement of said movable edge.

3. In a device of the class described, a resistance strip and a contact shoe, said strip and said shoe having straight line edges in the same plane in angular relationship with each other and having a point of contact between said edges, and means for moving one of said edges in said plane to another point of contact between said edges, the resistance strip comprising wire wrapped around a polygonal insulating block whereby a plurality of contact edges are formed, in combination with manually adjustable means for placing any selected one of said edges in operative position in said plane.

4. In a device of the class described, a resistance strip, a contact shoe and an indicator, said strip and said shoe having straight linear edges in the same plane in angular relationship with each other and having a point of contact between said edges, manually adjustable means for moving said resistance strip with relation to the contact shoe for zero adjustment of the indicator, pressure-responsive means for moving the contact shoe while maintaining a point of contact between said edges for indicating the change of pressure conditions upon said indicator, and manually operable means for varying the angular relationship between said edges in said plane, whereby the effective portion of said resistance strip may be adjusted for a given movement of the contact shoe and in accordance with the capacity of said pressure-responsive means.

CLARENCE A. DE GIERS.